Figure 1:
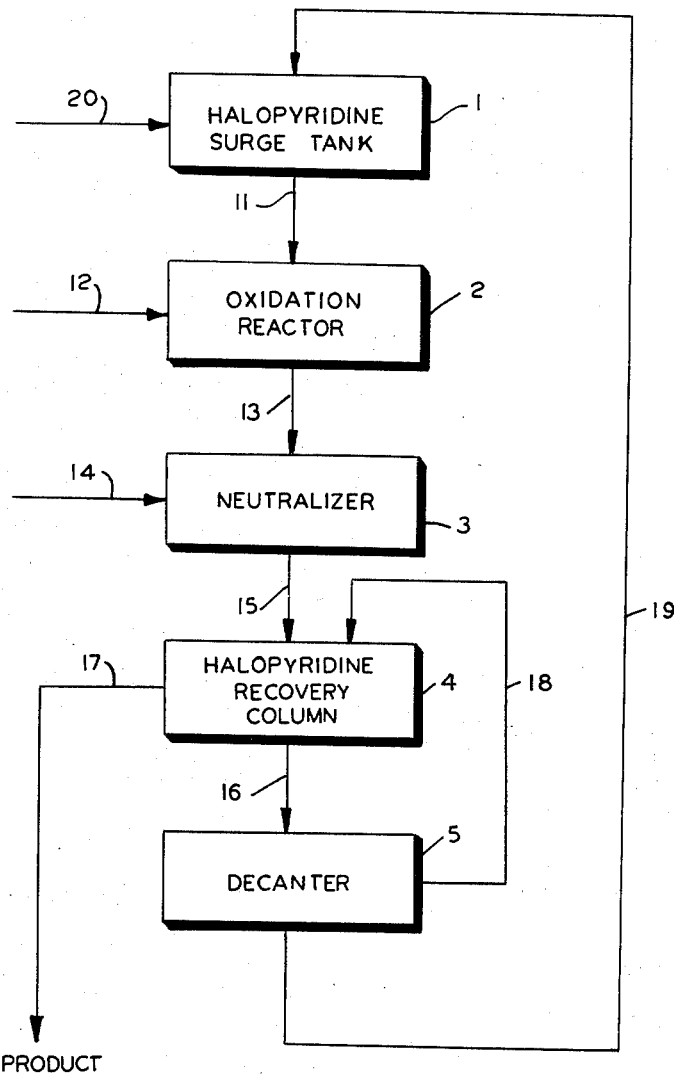

Sept. 6, 1960     D. A. SHERMER     2,951,844

CYCLIC PROCESS FOR MANUFACTURE OF 2-CHLOROPYRIDINE-1-OXIDE

Filed Nov. 5, 1958

INVENTOR
DAVID A. SHERMER

BY *Stanley J. Kerowski*

AGENT

United States Patent Office 2,951,844
Patented Sept. 6, 1960

2,951,844

CYCLIC PROCESS FOR MANUFACTURE OF 2-CHLOROPYRIDINE-1-OXIDE

David A. Shermer, Branford, Conn., assignor to Olin Mathieson Chemical Corporation, a corporation of Virginia Filed Nov. 5, 1958, Ser. No. 772,008

2 Claims. (Cl. 260—290)

This invention relates to the oxidation of halopyridines to produce the halopyridine-1-oxides. More particularly it relates to improvements in the use of aqueous peracetic acid to accomplish the oxidation of a 2-halopyridine, for example:

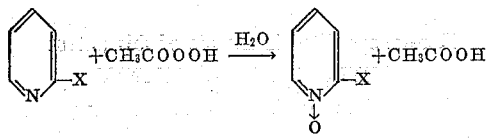

wherein X is a halogen, for example, fluorine, chlorine, bromine or iodine.

The oxidation of pyridine to its 1-oxide by peracetic acid is shown at page 79 of volume 33 of "Organic Syntheses," J. Wiley and Sons (1953), whereby 78% to 83% yields of pyridine-N-oxide were obtained by reacting a 40 weight percent solution of peracetic acid with pyridine using a molar excess of peracetic acid.

Although it might be expected that better yields could be obtained by increasing the proportion of peracetic acid used as reagent, it has now been surprisingly discovered that substantially 100% yields of a halopyridine-1-oxide, based on the halopyridine can be obtained by using a cyclic operation and a molar excess of halopyridine. Unreacted halopyridine is recovered and recycled. A further advantage of this process is the efficient use of peracetic acid. Up to an 80% yield of the oxide based on the peracetic acid is obtained in the process of the present invention together with substantially stoichiometric conversion of the halopyridine to its oxide in the cyclic operation of the present invention.

According to this invention the halopyridine is reacted with aqueous peracetic acid in a mole ratio of 0.4 to 0.8 mole of peracetic acid per mole of the halopyridine. The peracetic acid content of the aqueous solution is preferably about 30 to 50 weight percent. If more than about 0.8 moles of peracetic acid is used per mole of the halopyridine the former is uselessly decomposed resulting in low yields of the halopyridine oxide based on the oxidant. A reaction temperature of about 40° to 90° C. is most advantageous when the aqueous peracetic acid is added to the halopyridine. Temperatures lower than about 40° C. produce a slow reaction rate and an accumulation of peracetic acid with the danger of a sudden violent decomposition of the latter if the temperature increases. A temperature above 90° C. produces a reaction which is too rapid and difficult to control as well as inefficient use of peracetic acid due to thermal decomposition. A reaction time of about 1 to 4 hours is sufficient to consume all of the peracetic acid. The reaction mixture is then neutralized to a pH of 5 to 8, converting the acetic acid to an acetate salt, for example, using aqueous sodium hydroxide. Unreacted halopyridine is then recovered by distillation whereupon it comes overhead with water. The condensate separates into two phases and the halopyridine is separated from the water. After the halopyridine has thus been removed by distillation from the reaction mixture, the latter is cooled to precipitate most of the sodium acetate. It is removed, for example by filtration and the mother liquor is treated to obtain the halopyridine-1-oxide.

A convenient method for preparing the peracetic acid comprises mixing about 70 parts by weight of glacial acetic acid with 30 parts by weight of hydrogen peroxide in the presence of one part of sulfuric acid. The mixture contains about 40% peracetic acid, 40% acetic acid, 15% water and 5% hydrogen peroxide and is useful without further treatment in the process of this invention.

The block diagram of Figure 1 illustrates an equipment arrangement suitable for the practice of this invention. This cyclic process can be batch or continuous. During operation, the halopyridine is held in the surge tank 1 from where it is fed to the oxidation reactor 2 by means of line 11 along with peracetic acid by means of line 12. After a residence time of 1 to 4 hours at 40° to 90° C. the reaction mixture passes into the neutralizer 3 by means of line 13 along with an aqueous base, for example sodium hydroxide, by means of line 14. The acetic acid is neutralized before the mixture passes to the halopyridine recovery column 4 by means of line 15. The bottoms from this column 4 contain all of the halopyridine oxide along with water and acetic acid salt. This product is removed by line 17. The overhead from this column is sent to the decanter 5 through line 16 and comprises aqueous halopyridine. The decanter 5 separates the halopyridine from the water. The water is sent to the column 4 through line 18 and eventually all the water is removed in the bottoms coming through line 17. The halopyridine is drawn from the bottom of the decanter and is recycled to the surge tank 1 through line 19. Make-up halopyridine is also put into the surge tank, as required, through line 20.

The solution containing the halopyridine oxide removed as bottoms through line 17 is useful in the preparation of mercaptopyridine oxide as described in U.S. Patent 2,686,786 wherein an aqueous solution of halopyridine oxide is mercaptized with sodium sulfide or hydrosulfide. The presence of sodium acetate does not interfere with this reaction. If desired the halopyridine oxide can be separated from the product solution by precipitating the sodium acetate by cooling and extracting the mother liquor with a suitable solvent, for example, chloroform, decanting the chloroform extract and evaporating the chloroform therefrom to leave the halopyridine-N-oxide as residue. The evaporation should be carried out cautiously as the halopyridine-1-oxide can explode if contaminated.

The following examples further illustrate this invention:

*Example 1*

One mole of 2-chloropyridine was placed in a flask equipped with a thermowell, stirrer and addition funnel. The 2-chloropyridine was heated to 70° C. and 0.51 mole of peracetic acid in the form of the 40% aqueous solution described above was added through the funnel over a 15 minute period. The mixture was then stirred for 150 minutes while the temperature was maintained at 70° C. After this period the reaction mixture was neutralized with sodium hydroxide and the unreacted 2-chloropyridine was distilled out at about 115° C. with water. The distillate separated into two phases and 0.61 mole of 2-chloropyridine was recovered by decantation. Analysis of the residue from the distillation showed that 0.39 mole of 2-chloropyridine-N-oxide was produced indicating a substantially 100% yield based on the 2-chloropyridine consumed. The yield based on the peracetic acid was 77 percent. The recovered 2-chloropyridine was suitable for direct recycle to the oxidation reaction.

Upon repeating the above procedure using 1.2 moles of peracetic acid, only a 60% yield based on peracetic acid was obtained after 100% conversion of the latter. Although the product was satisfactory and the remaining 2-chloropyridine was recovered, it is economically disadvantageous to have such poor yields based on the costly peracetic acid.

*Example II*

One mole of 2-chloropyridine was placed in a flask equipped with a thermowell, stirrer and addition funnel. The 2-chloropyridine was heated to 45° C. and 0.6 mole of peracetic acid as a 40% aqueous solution was slowly added thereto with stirring. The reaction was stirred for 3 hours while the temperature was gradually raised from 45° to 70° C. The unreacted 2-chloropyridine was recovered by neutralizing the reaction mixture with sodium hydroxide, distilling and decanting the 2-chloropyridine from the aqueous phase of the condensate. It amounted to 0.58 mole. Analysis of the residue from the distillation showed that 0.42 mole of 2-chloropyridine-1-oxide was present corresponding to a 69% yield based on the peracetic acid and a 100% yield based on the chloropyridine consumed.

*Example III*

An arrangement as shown in Figure 1 was used to oxidize 2-chloropyridine to 2-chloropyridine-1-oxide. In this continuous run, a mixture comprising 104 pounds per hour of peracetic acid, 104 pounds per hour of acetic acid, and 39 pounds per hour of water was fed to the oxidizer 2 along with 260 pounds per hour of 2-chloropyridine from the surge tank 1. After a residence time of 2.5 hours in the oxidizer at 70° to 75° C. the mixture was passed into the neutralizer 3 along with 248 pounds per hour of 50% aqueous sodium hydroxide. From the neutralizer the neutralized mixture passed into the distillation column 4. The overhead from this column went to the decanter 5 from which the upper aqueous layer was returned to the column 4 while the lower 2-chloropyridine layer was sent to the surge tank 1 at the rate of 146 pounds per hour. A 2-chloropyridine make-up of 114 pounds per hour was put into the surge tank 1 through the line 20. This operation produced a product mixture, leaving the column 4 by means of line 17 which contained water, sodium acetate and 130 pounds per hour of 2-chloropyridine-1-oxide. Thus, the yield based on the 2-chloropyridine was substantially 100% while the yield based on peracetic acid was 73%.

I claim:

1. A cyclic process for the manufacture of 2-chloropyridine-1-oxide which comprises subjecting 2-chloropyridine to an oxidation reaction with aqueous peracetic acid in a ratio of 0.4 to 0.8 mole of peracetic acid per mole of 2-chloropyridine, neutralizing the reaction mixture with an aqueous base to a pH of 5 to 8, distilling the reaction mixture to separate the 2-chloropyridine-1-oxide product as bottoms and to remove water and unreacted 2-chloropyridine overhead, separating the 2-chloropyridine from the water and recycling the recovered 2-chloropyridine to the oxidation reaction.

2. The process of claim 1 wherein the reaction is carried out at 40° to 90° C.

References Cited in the file of this patent

UNITED STATES PATENTS 2,686,786     Shaw et al. _____ Aug. 17, 1954

OTHER REFERENCES

Meisenheimer: Chem. Abstracts, vol. 21, p. 94 (1927).
Clemo: Chem. Abstracts, vol. 32, p. 5402 (1938).
Bobranski et al.: Chem. Abstracts, vol. 33, p. 986 (1939).
Ochiai et al.: Chem. Abstracts, vol. 45, col. 8526 (1951).
Murray et al.: Chem. Abstracts, vol. 50, p. 1017 (1956).
Furukawa: Chem. Abstracts, vol. 50, p. 8639 (1956).